(12) United States Patent
Kim et al.

(10) Patent No.: US 8,709,639 B2
(45) Date of Patent: Apr. 29, 2014

(54) RECHARGEABLE BATTERY

(75) Inventors: Jun-Sik Kim, Yongin-si (KR);
Tae-Keun Kim, Yongin-si (KR);
Sae-Weon Roh, Yongin-si (KR);
Sung-Soo Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 276 days.

(21) Appl. No.: 12/844,897

(22) Filed: Jul. 28, 2010

(65) Prior Publication Data

US 2011/0097622 A1  Apr. 28, 2011

(30) Foreign Application Priority Data

Oct. 28, 2009 (KR) ........................ 10-2009-0102909

(51) Int. Cl.
*H01M 2/14* (2006.01)
*H01M 2/18* (2006.01)
*H01M 2/16* (2006.01)

(52) U.S. Cl.
CPC *H01M 2/18* (2013.01); *H01M 2/14* (2013.01); *H01M 2/1686* (2013.01)
USPC ............ 429/143; 429/131; 429/139; 429/247

(58) Field of Classification Search
CPC ........ H01M 2/14; H01M 2/1686; H01M 2/18
USPC .......................... 429/129–147, 163, 247–255
See application file for complete search history.

(56) References Cited

U.S. PATENT DOCUMENTS

| | | | | |
|---|---|---|---|---|
| 2,707,202 | A * | 4/1955 | Chubb | 429/139 |
| 2,990,441 | A * | 6/1961 | Marsal | 429/146 |
| 4,552,823 | A * | 11/1985 | Wozniak | 429/81 |
| 6,443,999 | B1 * | 9/2002 | Cantave et al. | 29/623.1 |
| 7,033,697 | B2 * | 4/2006 | Park et al. | 429/211 |
| 7,220,516 | B2 * | 5/2007 | Oosawa et al. | 429/210 |
| 7,682,752 | B2 * | 3/2010 | Nakamura et al. | 429/306 |

(Continued)

FOREIGN PATENT DOCUMENTS

| JP | 07-041347 | 2/1995 |
|---|---|---|
| JP | 07-153488 A | 6/1995 |

(Continued)

OTHER PUBLICATIONS

Korean Office action issued by KIPO on Dec. 22, 2011, corresponding to KR 10-2009-0102909 and Request for Entry attached herewith.

(Continued)

*Primary Examiner* — Basia Ridley
*Assistant Examiner* — James Irwin
(74) *Attorney, Agent, or Firm* — Robert E. Bushnell, Esq.

(57) ABSTRACT

A rechargeable battery that includes: an electrode assembly generating a current; a case accommodating the electrode assembly therein; and a cap assembly coupled to the case so as to be electrically connected with the electrode assembly. The electrode assembly includes a first electrode, a separator, and a second electrode that are sequentially stacked, and the separator includes a main body part disposed between the first and second electrodes and protrusions formed that protrude from the main body part to the side of at least one of an end portion of the first electrode and an end portion of the second electrode.

12 Claims, 7 Drawing Sheets

(56) References Cited

U.S. PATENT DOCUMENTS

| | | | |
|---|---|---|---|
| 7,758,997 B2* | 7/2010 | Matsumoto et al. | 429/133 |
| 7,931,980 B2* | 4/2011 | Kwak et al. | 429/142 |
| 7,968,224 B2* | 6/2011 | Sudano et al. | 429/128 |
| 8,192,858 B2* | 6/2012 | Fujita et al. | 429/139 |
| 2002/0004171 A1* | 1/2002 | Kimijima et al. | 429/246 |
| 2005/0271947 A1* | 12/2005 | Nilsson | 429/251 |
| 2006/0035152 A1* | 2/2006 | Nishimura et al. | 429/234 |
| 2006/0269835 A1* | 11/2006 | Song | 429/142 |
| 2007/0117008 A1* | 5/2007 | Kaneko et al. | 429/152 |
| 2008/0241672 A1 | 10/2008 | Utsumi et al. | |
| 2008/0274394 A1* | 11/2008 | Schormann et al. | 429/50 |
| 2009/0029242 A1 | 1/2009 | Hirakawa | |
| 2009/0053605 A1 | 2/2009 | Harada et al. | |
| 2009/0130546 A1* | 5/2009 | Byun et al. | 429/129 |

FOREIGN PATENT DOCUMENTS

| | | |
|---|---|---|
| JP | 10188937 A | 7/1998 |
| JP | 2001-185120 A | 7/2001 |
| JP | 2007-328980 | 12/2007 |
| JP | 2009-146792 A | 7/2009 |
| KR | 10-2007-0073169 | 7/2007 |

OTHER PUBLICATIONS

Korean Office Action issued by Korean Patent Office on Jul. 11, 2011, corresponding to Korean Patent Application No. 10-2009-0102909 and Request for Entry of the Accompanying Office Action attached herewith.

* cited by examiner

RECHARGEABLE BATTERY

RELATED APPLICATIONS

This application claims priority to and the benefit of Korean Patent Application No. 10-2009-0102909 filed in the Korean Intellectual Property Office on Oct. 28, 2009, the entire contents of which are incorporated herein by reference.

BACKGROUND

1. Field

The described technology relates generally to a rechargeable battery.

2. Description of the Related Art

As an example, a cylindrical rechargeable battery includes an electrode assembly formed by sequentially winding a positive electrode, a separator, and a negative electrode in a jelly roll form, a case accommodating the electrode assembly therein, and a cap assembly hermetically sealing an opening of the case.

In the electrode assembly, the positive electrode and the negative electrode include a region coated with an active material and a region on which an active material is not coated, respectively, and the positive electrode uncoated region and the negative electrode uncoated region are provided at respective ends of the electrode assembly in a widthwise direction. A negative electrode collecting plate is attached to the negative electrode uncoated region, and a positive electrode collecting plate is attached to the positive electrode uncoated region. The negative electrode collecting plate is connected with the case, and the positive electrode collecting plate is connected with the cap assembly in order to induce current to the exterior.

The above information disclosed in this Related Art Section is only for enhancement of understanding of the background of the described technology and therefore it may contain information that does not form the prior art that is already known in this country to a person of ordinary skill in the art.

SUMMARY OF THE INVENTION

The described technology provide for a rechargeable battery having advantages of preventing a short-circuit of electrodes by inducing alignment of electrodes by means of a separator.

An aspect of the present invention provides a rechargeable battery in which end portions of electrodes are supported by a separator to thereby prevent a short-circuit of the electrodes due to active material fragments and burrs of a current collector. Another aspect of the present invention provides a rechargeable battery in which both ends in a widthwise direction of electrodes are supported by a separator to thereby increase electrolyte saturation and storage properties to facilitate transmission of lithium ions.

An exemplary embodiment of the present invention provides a rechargeable battery including: an electrode assembly generating current; a case accommodating the electrode assembly therein; and a cap assembly coupled to the case so as to be electrically connected with the electrode assembly, wherein the electrode assembly includes a first electrode, a separator, and a second electrode that are sequentially stacked, and the separator includes a main body part disposed between the first and second electrodes and protrusions formed to be protruded from the main body part to the side of at least one of an end portion of the first electrode and an end portion of the second electrode.

The first and second electrodes may include a coated region formed by an active material coated on a current collector made of a metal material, and an uncoated region of the current collector on which an active material is not coated, formed at one side of the coated region, and the protrusions may be formed to be protruded from the side of the end portion of the coated region.

The protrusions may be protruded from both surfaces of the main body part to correspond to an end portion of the first electrode coated region and that of the second electrode coated region that face each other.

An upward directional height and a downward directional height of the protrusions set in the upward direction and in the downward direction of the main body part may be equal to the thickness of the corresponding coated regions of the first and second electrodes.

The protrusions may include a first protrusion formed at an end portion of the uncoated region of the first electrode and the coated region of the second electrode, and a second protrusion formed at an end portion of the uncoated region of the second electrode and the coated region of the first electrode.

The protrusion may include an electrode end portion protrusion protruded from one surface of the main body part to correspond to the entire end portion of one of the first electrode and the second electrode, and a coated end portion protrusion that corresponds to the end portion of the coated region of the one electrode at the opposite side of the electrode end portion protrusion.

The electrode end portion protrusion and the coated end portion protrusion may be alternately disposed along a direction of the stacking disposition at the uncoated region side of the first electrode or at the uncoated region side of the second electrode.

The protrusions may be protruded from one surface of the main body part and may be set to have different heights at the uncoated region side of the first electrode and at the uncoated region side of the second electrode.

Over the widthwise direction between the uncoated region of the first electrode and that of the second electrode, a first width of the first electrode coated region may be smaller than a second width of the second electrode coated region, and at the protrusion, a third width of a first coated region protrusion formed to correspond to the coated region of the first electrode may be larger than a fourth width of a second coated region protrusion formed to correspond to the coated region of the second electrode.

The first coated region protrusion and the second coated region protrusion may be disposed alternately by twos along a direction of the stacking disposition at the uncoated region side of the first electrode or at the uncoated region side of the second electrode.

The protrusions of the separator may have a section in a streamlined shape or a quadrangular shape.

The protrusions and the main body part of the separator may be made of the same material or may be made of different materials, respectively.

The protrusions and the main body part of the separator may be formed to have the same porous structure or different porous structures.

The main body part of the separator, excluding the protrusions, may be formed through pressing. The protrusions at both ends of the separator may be formed through thermal fusion (i.e., thermal bonding).

As mentioned above, according to an exemplary embodiment of the present invention, the protrusions formed at the separator such that they correspond to the side of the end portions of the first and second electrodes induce alignment of the separator, the first electrode, and the second electrode, so a short-circuit between the first and second electrodes can be prevented.

Because the end portions of the first and second electrodes are supported by the protrusions of the separator, a short-circuit between the first and second electrodes due to active material fragments forming the coated region and burrs of the current collectors of the first and second electrodes can be prevented.

Further, because the protrusions of the separator support both end portions in the widthwise direction of the first and second electrodes, the electrolyte saturation and storage properties can be increased to facilitate transmission of lithium ions.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

In a conventional lithium ion rechargeable battery, a separator is disposed between the positive electrode and the negative electrode to electrically insulate them, and facilitates transmission of lithium ions. The separator is formed as a porous film, which may include single, double, or triple films, using a high polymer, ceramic, or other composite material.

In the conventional lithium ion rechargeable battery, because the separator is provided between the positive electrode and the negative electrode, while not supporting both ends of the positive electrode and the negative electrode in the widthwise direction, it is difficult for the separator to serve to help improve the alignment of the positive electrode and the negative electrode and wetting properties (i.e., impregnation or saturation) of the electrolyte when the positive electrode, the negative electrode, and the separator are wound in a jelly roll form.

Thus, in the conventional lithium ion rechargeable battery, if the positive electrode, the separator, and the negative electrode are misaligned, the positive electrode and the negative electrode are likely to be short-circuited at one side of the separator, and in addition, when the positive electrode and the negative electrode are cut, they are likely to be short-circuited due to released active material fragments or by burrs generated from a current collector made of a metal material.

Figure 1:
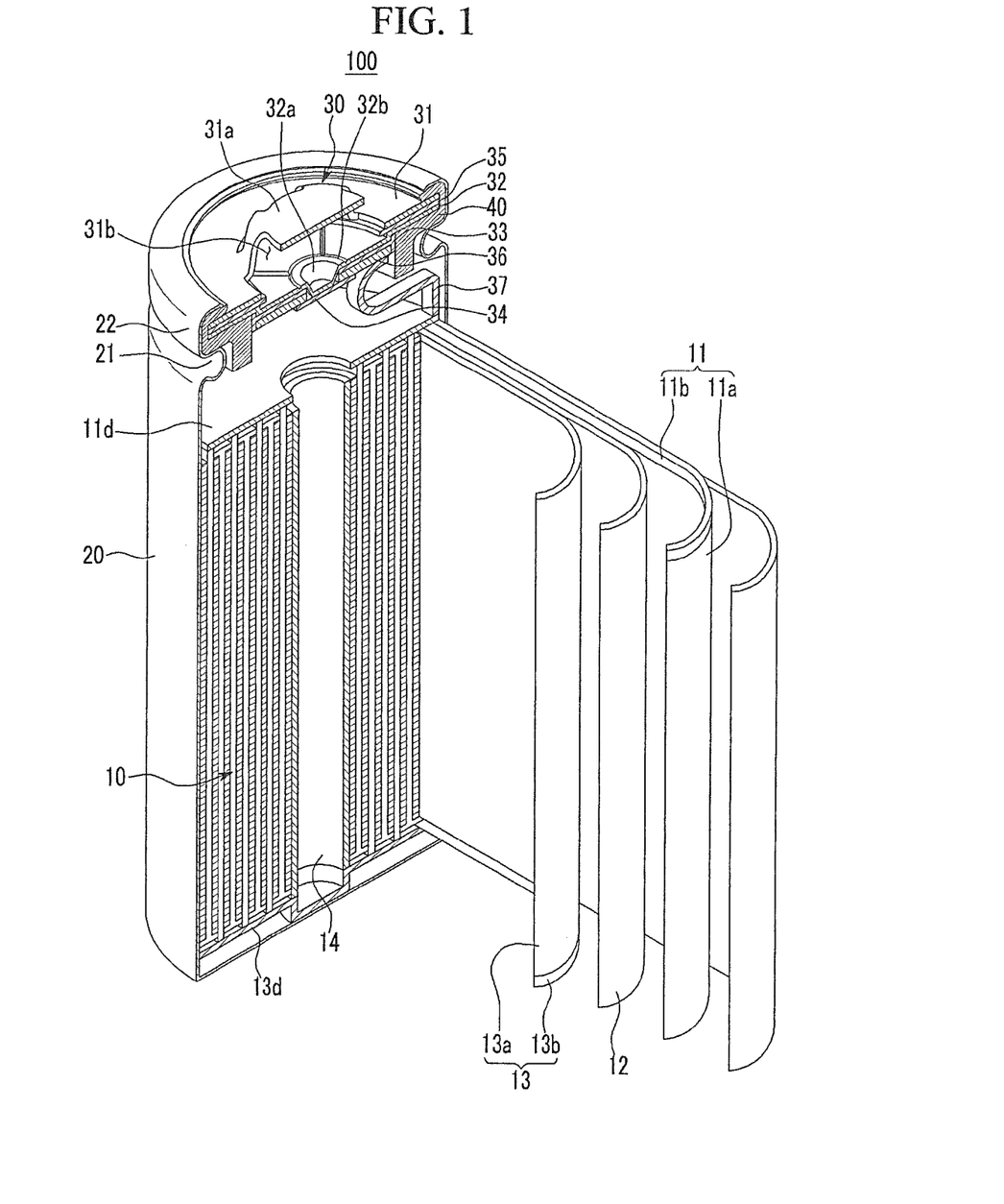
FIG. 1 is a sectional perspective view of a rechargeable battery according to a first exemplary embodiment of the present invention.

FIG. 1 is a sectional perspective view of a rechargeable battery according to a first exemplary embodiment of the present invention. With reference to FIG. 1, a rechargeable battery 100 according to the first exemplary embodiment of the present invention includes an electrode assembly 10 generating a current, a case accommodating the electrode assembly 10, and a cap assembly 30 coupled to the case 20 so as to be electrically connected with the electrode assembly 10.

Figure 2:
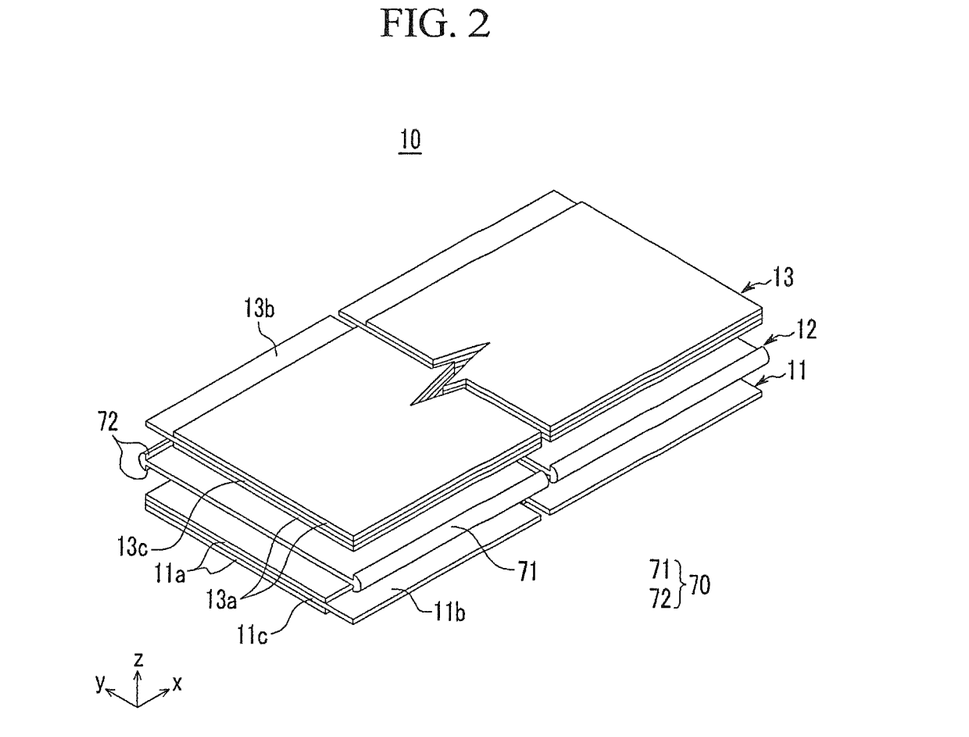
FIG. 2 is an exploded perspective view of an electrode assembly of FIG. 1.

FIG. 2 is an exploded perspective view of an electrode assembly of FIG. 1. With reference to FIG. 2, the electrode assembly 10 includes a first electrode 11 (referred to as a "positive electrode", hereinafter), a separator 12, and a second electrode 13 (referred to as a "negative electrode", hereinafter).

The electrode assembly 10 is formed by winding the positive electrode 11, the negative electrode 13, and the separator 12 as an insulator disposed therebetween, together. For example, the electrode assembly 10 is formed to have a cylindrical shape. A sector pin 14 is disposed at the center of the cylindrical electrode assembly 10. The sector pin 14 maintains the cylindrical shape of the electrode assembly 10.

The positive electrode 11 and the negative electrode 13 include current collectors 11c and 13c each formed as a metal foil, coated regions 11a and 13a with an active material coated on both surfaces of the current collectors 11c and 13c, and uncoated regions 11b and 13b on which an active material is not coated. In a jelly roll state, a positive electrode collecting plate 11d is connected to the uncoated region 11b of the positive electrode 11 and a negative electrode collecting plate 13d is connected to the uncoated region 13b of the negative electrode 13.

The case 20 may have a cylindrical shape or a square shape with one side thereof open to allow the electrode assembly 10 to be inserted therethrough. The case 20 is connected to the negative electrode collecting plate 13d so as to serve as a negative terminal in the rechargeable battery 100, and is made of a conductive metal such as aluminum, an aluminum alloy, or nickel-plated steel.

The cap assembly 30 is coupled to an opening side of the case 20 with a gasket 40 interposed therebetween to hermetically seal the case 20 accommodating the electrode assembly 10 and electrolyte. The cap assembly includes a current interruption unit, and is electrically connected to the electrode assembly 10 via the current interruption unit.

Figure 3:
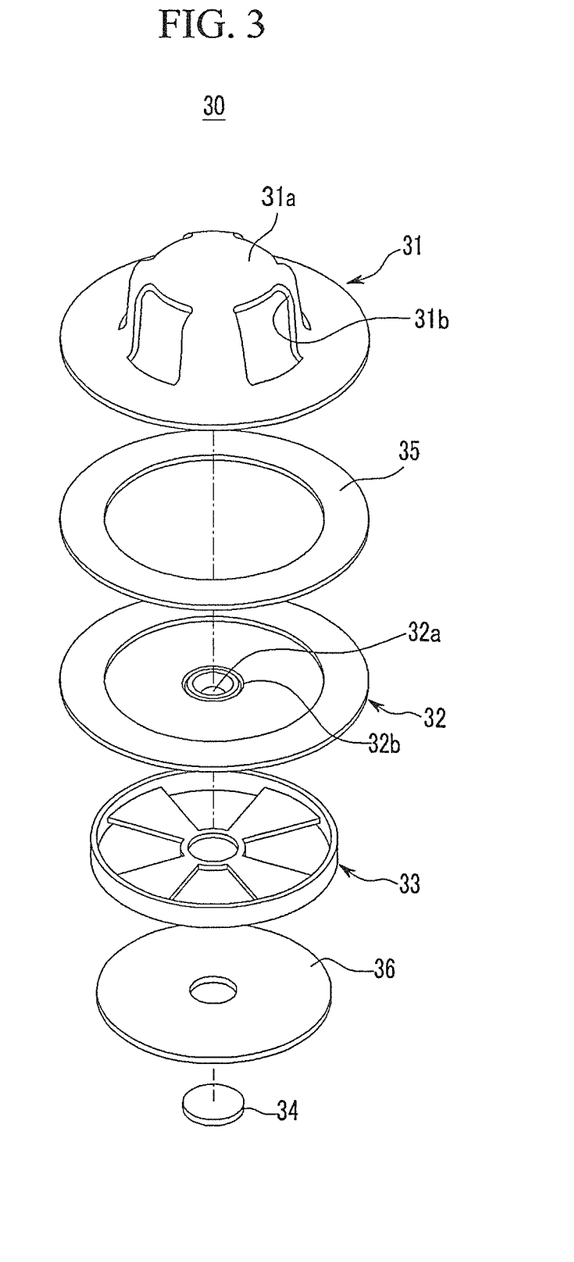
FIG. 3 is an exploded perspective view of a cap assembly of FIG. 1.
Figure 4:
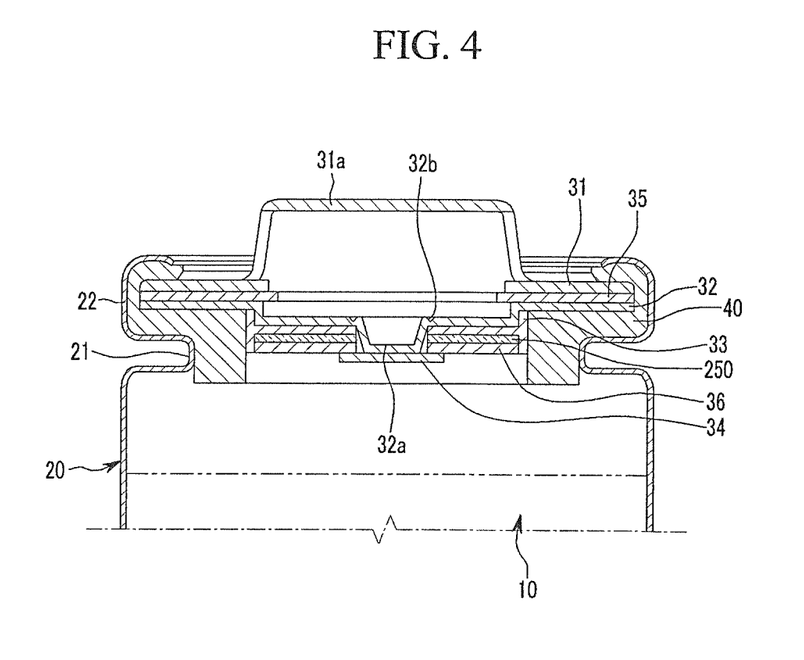
FIG. 4 is a cross-sectional view of the cap assembly of FIG. 1.

FIG. 3 is an exploded perspective view of a cap assembly of FIG. 1, and FIG. 4 is a cross-sectional view of the cap assembly of FIG. 1. With reference to FIGS. 3 and 4, the cap assembly 30 includes a cap plate 31, a vent plate 32, an insulating plate 33, a sub-plate 34, a positive temperature coefficient element 35, and a middle plate 36.

Substantially, the current interruption unit is formed by the vent plate 32 and the sub-plate 34, and a connection portion of the current interruption unit is formed as the vent plate 32 and the sub-plate 34 are welded.

The cap plate 31 is finally connected with the positive electrode collecting plate 11d to serve as a positive terminal of the rechargeable battery 100. The cap plate 31 includes an outwardly protruded terminal 31a and exhaust holes 31b.

The vent plate 32 forming one portion of the current interruption unit is installed at an inner side of the cap plate 31 and electrically connected to the sub-plate 34 forming another portion of the current interruption unit.

The vent plate 32 includes a vent 32a that is to be damaged under a pre-set pressure condition to discharge a gas from the interior of the rechargeable battery 100 and interrupt an electrical connection with the sub-plate 34.

When the current interruption unit operates, that is, when the connection portion of the vent plate 32 and the sub-plate 34 is separated, the electrode assembly 10 and the cap plate 31 are electrically separated.

As an example, the vent 32a is formed to be protruded to the inner side of the case 20 from the vent plate 32. The vent plate 32 includes a notch 32b formed around the vent 32a to guide damage to the vent 32a (See FIGS. 1, 3, and 4). When the pressure increases due to a 13 gas generated within the case 20, the notch 32b is damaged in advance to discharge the gas to thus prevent explosion of the rechargeable battery 100.

The positive temperature coefficient element 35 is installed between the cap plate 31 and the vent plate 32 to control a current flow between the cap plate 31 and the vent plate 32. In a state of exceeding a pre-set temperature, the positive temperature coefficient element 35 has electrical resistance, and thus it interrupts flow of a charge or discharge current.

The sub-plate 34 faces the vent plate 32 with the insulating plate 33 interposed therebetween, and is electrically connected with the vent 32a. Also, the middle plate 36 is disposed between the insulating plate 33 and the sub-plate 34. The insulating plate 33 and the middle plate 36 have through holes 33a and 36a, respectively, and the vent 32a provided through the through holes 33a and 36a is connected with the sub-plate 34.

Accordingly, the middle plate 36 is electrically connected with the vent plate 32 through the vent plate 32 through the sub-plate 34 and the vent 32a at one side, and is also connected with the positive electrode collecting plate 11d through a connection member 37 at another side (See FIG. 1). Consequently, the positive electrode collecting plate 11d is electrically connected with the cap plate 31 through the connection member 37, the middle plate 36, the sub-plate 34, the vent 32a, the vent plate 32, and the positive temperature coefficient element 35.

The cap assembly 30 formed thusly is inserted into the case 20 and then fixed to the case 20 through a clamping process. Then, a beading part 21 and a clamping part 22 are formed.

Figure 5:
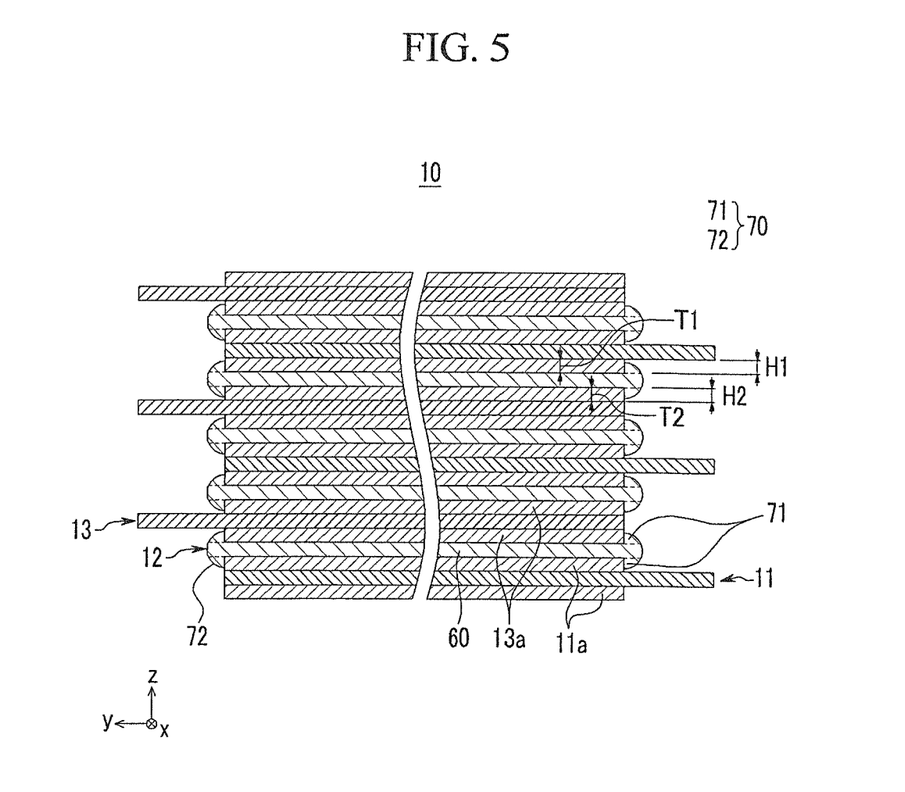
FIG. 5 is a partial cross-sectional view of the electrode assembly of FIG. 1.

FIG. 5 is a partial cross-sectional view of the electrode assembly of FIG. 1. With reference to FIGS. 2 and 5, the separator 12 includes a main body part 60 disposed between the positive electrode 11 and the negative electrode 13, and protrusions 70 formed to be higher than the main body part 60 at regions corresponding to the end portions of the positive electrode 11 and the negative electrode 13.

The protrusions 70 may be formed at diverse positions depending on the structure in which the positive electrode 11, the separator 12, and the negative electrode 13 are stacked, and depending on where the uncoated regions 11b and 13b are formed. For example, if the positive electrode and the negative electrode are formed in a quadrangular shape and stacked, the separator may have protrusions formed at second and third sides, excluding a first side where an uncoated region is formed, to induce alignment of the positive electrode and the negative electrode (not shown).

In the first exemplary embodiment of the present invention, the protrusions are formed at the end portions of the main body part 60, that is, at both ends in a widthwise direction of the main body part 60. The protrusions 70 formed at both end portions are protruded to the side of the end portions of the positive electrode 11 and the negative electrode 13 and tightly attached to end portions when the positive electrode 11, the separator 12, and the negative electrode 13 are stacked (See FIG. 2) and wound along a lengthwise direction (i.e., x-axis direction), thus aligning the positive electrode 11, the negative electrode 13, and the main body part 60 (See FIG. 5). Accordingly, a short-circuit otherwise caused by misalignment of the positive electrode 11 and the negative electrode 13 can be prevented.

The protrusions 70 formed at the end portions of the main body part 60 may be variably formed depending on the shape and size of the coated regions 11a and 13a and the uncoated regions 11b and 13b of the positive electrode 11 and the negative electrode 13. For example, in the first exemplary embodiment of the present invention, the protrusions are formed to be protruded to the side of the end portions of the coated regions 11a and 13a from both surfaces of the main body part 60 and tightly attached to the end portions of the coated regions 11a and 13a to set the positions of the positive electrode 11 and the negative electrode 13, thereby inducing alignment of the positive electrode 11 and the negative electrode 13 when the positive electrode 11 and the negative electrode 13 are wound.

The protrusions 70 are protruded up and down from the main body part 60 based on a vertical direction (z-axis direction), and have an upward height H1 in an upward direction and a downward height H2 in a downward direction. The upward height H1 and the downward height H2 of the protrusions 70 tightly attached to the coated regions 11a and 13a of the positive and negative electrodes 11 and 13 or tightly attached to the coated regions 13a and 11a of the negative and positive electrodes 13 and 11 are equal to the thicknesses T1 and T2 of the coated regions 11a and 13a of the positive and negative electrodes 11 and 13 or the coated regions 13a and 11a of the negative and positive electrodes 13 and 11 (H1=T1 and H2=T2). Accordingly, the protrusions 70 formed at the separator 12 allow the uncoated regions 11b and 13b to be drawn out between the protrusions 70 neighboring in the z-axis direction, while aligning the positive and negative electrodes 11 and 13.

Each of the protrusions 70 includes first and second protrusions 71 and 72 disposed at both sides based on the widthwise direction (i.e., y-axis direction) of the main body part 60. The first protrusion 71 is tightly attached to the end portions of the coated regions 11a and 13a of the positive and negative electrodes 11 and 13 at the uncoated region 11b side of the positive electrode 11, and the second protrusion 72 is tightly attached to the end portions of the coated regions 11a and 13a of the positive and negative electrodes 11 and 13 at the coated region 13b side of the negative electrode 13.

Because the protrusion 70 is protruded in the vertical direction of the main body part 60 so as to be tightly attached to the coated regions 11a and 13a, it can maintain the alignment state of the positive and negative electrodes 11 and 13. The first and second protrusions 71 and 72 firmly maintain the alignment state of the positive and negative electrodes 11 and 13 and the separator 12 at both ends in the widthwise direction.

The protrusions 70 of the separator are disposed to form a large porous volume at an outer side of the coated regions 11a and 13a, so saturation of electrolyte can be improved to thus facilitate transmission of lithium ions and improve storage properties of electrolyte.

Various exemplary embodiments of the present invention will now be described. A description of the same elements as those of the first exemplary embodiment will be omitted, and different elements from those of the first exemplary embodiment will be described.

Figure 6:
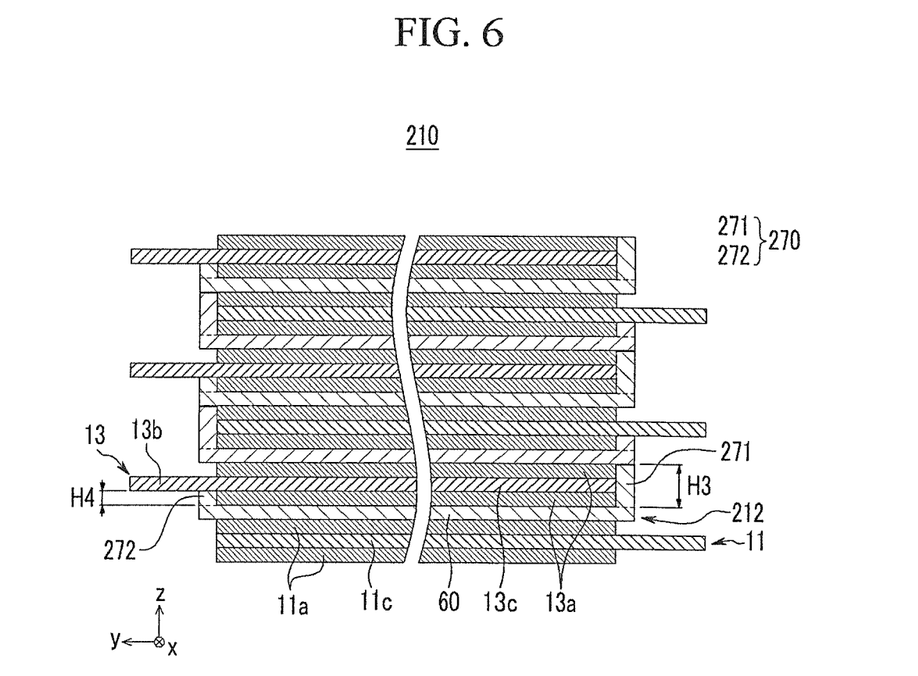
FIG. 6 is a partial sectional view of an electrode assembly according to a second exemplary embodiment of the present invention.

FIG. 6 is a partial sectional view of an electrode assembly 210 according to a second exemplary embodiment of the present invention.

In the first exemplary embodiment of the present invention as described above, the first and second protrusions 71 and 72 formed at both ends in the widthwise direction of the separator 12 have the same structure. In comparison, with reference to FIG. 6, in the second exemplary embodiment of the present invention, a protrusion 270 includes an electrode end portion protrusion 271 and a coated end portion protrusion 272 that are provided at both ends in the widthwise direction of a separator 212, and in this case, the electrode end portion protrusion 271 and the coated end portion protrusion 272 have different structures. Also, compared with the protrusion 70 formed to be protruded from both surfaces of the separator 12 in the first exemplary embodiment, the protrusion 270 in the second exemplary embodiment of the present invention is protruded from one surface of the separator 212.

The electrode end portion protrusion 271 is protruded from one surface of the main body part 60 to correspond to the entire end portion of one of the positive and negative electrodes 11 and 13 and tightly attached to the entire end portion of the electrode. For example, the electrode end portion protrusion 271 is tightly attached to the end portions of the double-sided coated regions 13a and the current collector 13c. Thus, the electrode end portion protrusion 271 can more effectively prevent a short-circuit of the electrode due to active material fragments or burrs of the current collectors 11c and 13c, as well as aligning the positive and negative electrodes 11 and 13 and maintaining the alignment state.

The coated end portion protrusion 272 is protruded to correspond to the end portion of the coated region 11a of the positive electrode 11 or the coated region 13a of the negative electrode 13, and is tightly attached to the coated regions 11a and 13a at the opposite side of the electrode end portion protrusion 271. Accordingly, as the coated end portion protrusion 272 is tightly attached to the end portions of the coated regions 11a and 13a, rather than being tightly attached to the end portions of the current collectors 11c and 13c, it allows the uncoated regions 11b and 13b to be drawn out.

That is, the electrode end portion protrusion 271 and the coated end portion protrusion 272 are protruded from the same surface of the main body part 60 of the separator 212, and in this case, a height H3 of the electrode end portion protrusion 271 is higher than a height H4 of the coated end portion protrusion 272. Because the electrode end portion protrusion 271 by the height H3 is tightly attached to the entire end portion of the positive and negative electrodes 11 and 13, a short-circuit of the positive and negative electrodes 11 and 13 can be prevented even without the presence of a protrusion on the opposite surface of the main body part 60.

Because the uncoated regions 11b and 13b of the positive and negative electrodes 11 and 13 are disposed at both sides of the separator 12 in the widthwise direction (i.e., y-axis direction), the electrode end portion protrusion 271 and the coated end portion protrusion 272 are alternately disposed along the direction of the stacking disposition (i.e., the z-axis direction) at the uncoated region 11b side of the positive electrode 11 or at the uncoated region 13b side of the negative electrode 13.

Figure 7:
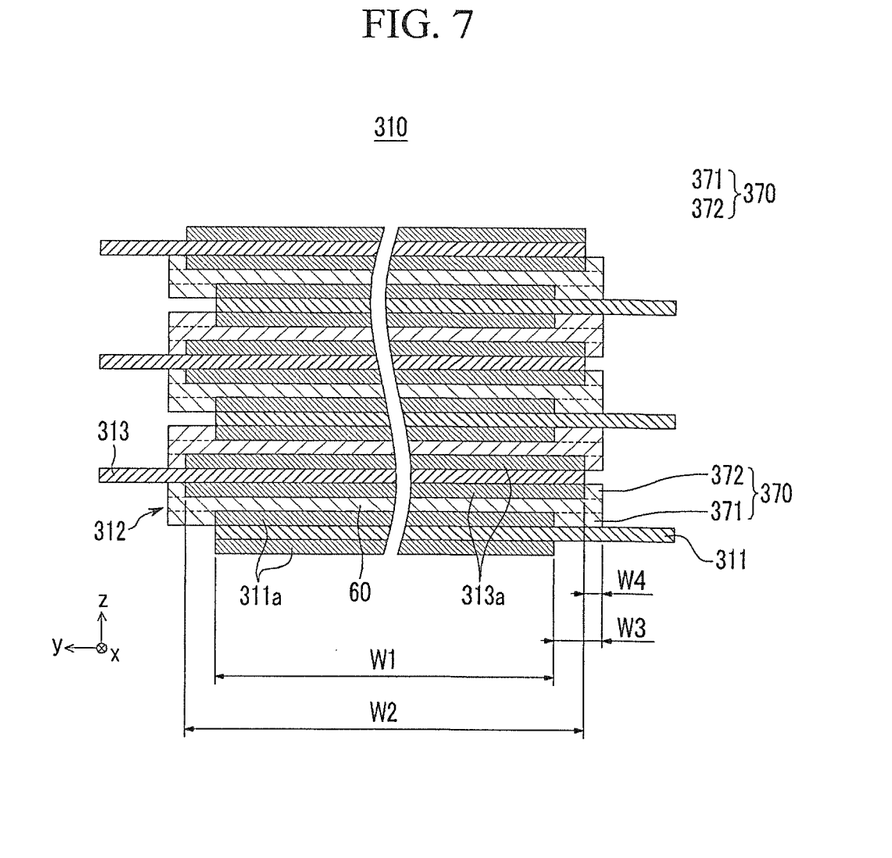
FIG. 7 is a partial cross-sectional view of an electrode assembly according to a third exemplary embodiment of the present invention.

FIG. 7 is a partial cross-sectional view of an electrode assembly 310 according to a third exemplary embodiment of the present invention.

In the first exemplary embodiment as described above, the positive and negative electrodes 11 and 13 include the coated regions 11a and 13a having the same width. In comparison, in the third exemplary embodiment of the present invention, positive and negative electrodes 311 and 313 have coated regions 311a and 313a each having a different width. That is, the coated region 311a of the positive electrode 311 has a first width W1, while the coated region 313a of the negative electrode 313 has a second width W2 that is larger than the first width W1.

Accordingly, the protrusion 370 of the separator 312 includes a first coated region protrusion 371 and a second coated region protrusion 372. The first coated region protrusion 371 is formed to correspond to the coated region 311a of the positive electrode 311 and has a third width (W3), and the second coated region protrusion 372 is formed to correspond to the coated region 313a of the negative electrode 313 and has a fourth width W4 that is smaller than the third width W3 The sum (W1+W3) of the first width W1 and the third width W3 is equal to the sum (W2+W4) of the second width W2 and the fourth width W4.

Because the coated region 311a of the positive electrode 311 has the first width W1 that is smaller than the second width W2 of the coated region 313a of the negative electrode 313 and because the first coated region protrusion 371 has the third width W3 that is larger than the fourth width W4 of the second coated region protrusion 372, a short-circuit of the positive and negative electrodes 311 and 313 can be more effectively prevented and the saturation and storage properties of electrolyte can be improved.

The first and second coated region protrusions 371 and 372 protruded to the side of the end portions of the coated regions 311a and 313a from both ends of the main body part 60 of the separator 312 are alternately disposed by twos along the direction of the stacking disposition (i.e., z-axis direction) at the uncoated region 311b side of the positive electrode 311 or the uncoated region 313b side of the negative electrode 313. Accordingly, the uncoated regions 311b and 313b of the positive and negative electrodes 311 and 313 can be drawn out.

In the third exemplary embodiment, as shown in FIGS. 5 to 7, the protrusions 70 of the separator 12 may have a section in a streamlined shape, and the protrusions 270 and 370 of the separators 212 and 312 may have a section in a square (or quadrangular) shape. That is, because the protrusions 70, 270, and 370 may have various outer forms, they can be fabricated according to various methods.

Referring to the first exemplary embodiment of the present invention, the protrusions 70 and the main body part 60 of the separator 12 may be made of the same material or different materials. Also, the protrusions 70 and the main body part 60 of the separator 12 may be formed to have the same porous structure or different porous structures. That is, the separator 12 may be made of various materials and formed to have various porous structures.

Of the separator 12, the main body part 60, excluding the protrusions 70, may be formed by pressing, and the protrusions 70 may be formed at both ends of the separator 12 through thermal fusion (or thermal bonding). That is, the protrusions 70 and the main body part 60 may be fabricated according to various methods.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery, comprising:
   an electrode assembly generating current;
   a case accommodating the electrode assembly therein; and
   a cap assembly coupled to the case so as to be electrically connected with the electrode assembly, the electrode assembly comprising:
      a first electrode having a coated region and an uncoated region, a separator, and a second electrode having a coated region and an uncoated region that are sequentially stacked, the separator comprising:
         a main body part disposed between the first and second electrodes in direct contact with and completely covering said coated region of the first and second electrodes and not the uncoated region of the first and second electrodes; and
         protrusions formed to protrude from the main body part to the side of at least one of an end portion of the coated region of the first electrode and an end portion of the coated region of the second electrode, said protrusions solely directly contact said end portions of the first and second electrode and extend beyond the coated regions of the first and second electrodes and do not come in contact with any other portion of either the first or second electrodes.

2. The rechargeable battery of claim 1, wherein the first and second electrodes further comprise:
   the coated region of the first and second electrodes being formed by an active material coated on a first and second current collector, the first and second current collectors being made of a metal material; and
   the uncoated region of the first and second electrodes being formed at one side of the first and second current collector where an active material is not coated; and
   the protrusions of the separator being formed to protrude beyond the side of the end portion of the coated region.

3. The rechargeable battery of claim 2, wherein the protrusions protrude from both surfaces of the main body part to correspond to an end portion of the first electrode coated region and that of the second electrode coated region that face each other.

4. The rechargeable battery of claim 3, wherein an upward directional height and a downward directional height of the protrusions set in the upward direction and in the downward direction of the main body part are equal to the thickness of the corresponding coated regions of the first and second electrodes.

5. The rechargeable battery of claim 3, wherein the protrusions of the separator further comprise:
   a first protrusion formed to correspond to an end portion of the uncoated region of the first electrode and the coated region of the second electrode; and
   a second protrusion formed to correspond to an end portion of the uncoated region of the second electrode and the coated region of the first electrode.

6. The rechargeable battery of claim 1, wherein the protrusions and the main body part of the separator are made of the same material.

7. The rechargeable battery of claim 1, wherein the protrusions and the main body part of the separator are made of different materials.

8. The rechargeable battery of claim 1, wherein the protrusions and the main body part of the separator are formed to have the same porous structure.

9. The rechargeable battery of claim 1, wherein the protrusions and the main body part of the separator are formed to have different porous structures.

10. The rechargeable battery of claim 1, wherein the main body part of the separator, excluding the protrusions, is formed through pressing.

11. The rechargeable battery of claim 1, wherein the protrusions at both ends of the separator are formed through thermal fusion.

12. A rechargeable battery, comprising:
    an electrode assembly generating current;
    a case containing the electrode assembly, the electrode assembly comprised of a first electrode having a coated region and an uncoated region, a separator, and a second electrode having a coated region and an uncoated region that are sequentially stacked; and
    a cap assembly coupled to the case so as to be electrically connected with the electrode assembly, the separator comprising:
       a main body part disposed between the first and second electrodes in direct contact with and completely covering said coated region of the first and second electrodes and not the uncoated region of the first and second electrodes; and
       protrusions formed to protrude from the main body part to the side of at least one of an end portion of the coated region of the first electrode and an end portion of the coated region of the second electrode, the protrusions being wider than the main body part, said protrusions solely directly contact said end portions of the coated regions of the first and second electrode and extend beyond the coated regions of the first and second electrodes and do not come in contact with any other portion of either the first or second electrodes.

* * * * *